Jan. 9, 1945. A. F. PFINGSTEN 2,366,871
COMBINATION AERIAL AND TURN INDICATOR
Filed June 12, 1941 2 Sheets-Sheet 1

INVENTOR
August F. Pfingsten
BY Saul J. Slotsky
ATTORNEY

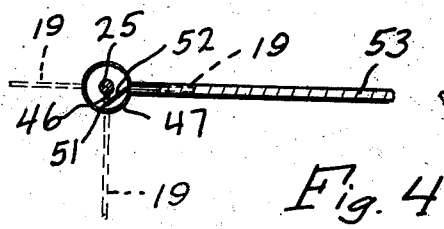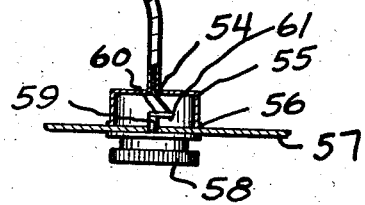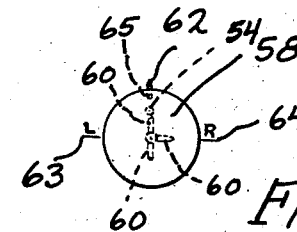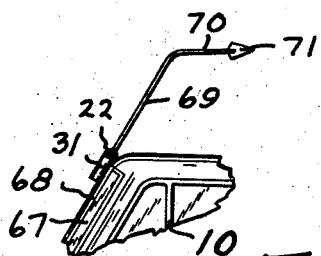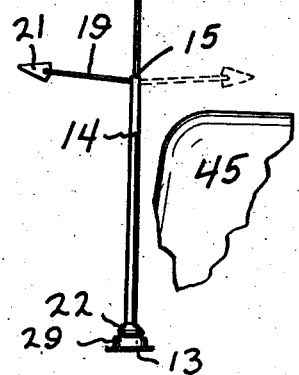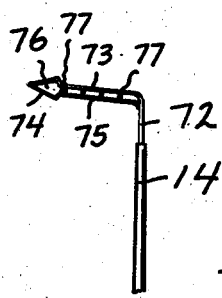

Patented Jan. 9, 1945

2,366,871

UNITED STATES PATENT OFFICE 2,366,871

COMBINATION AERIAL AND TURN INDICATOR

August F. Pfingsten, Rock Rapids, Iowa

Application June 12, 1941, Serial No. 397,683

2 Claims. (Cl. 177—327)

My invention pertains to a turn indicator for automobiles.

An object of my invention is to provide a turn indicator which is substantially an integral part of the vertical type of radio aerial employed on the automobile.

A further object of my invention is to provide a turn indicator which is directly movable to positively indicate directions, and which can be turned by either electrical or mechanical means.

A further object of my invention is to provide such an arrangement without injuring the capacity effect of the aerial and which can be used on the collapsing type of aerial either at the end thereof, or at a fixed portion thereof.

A further object of my invention is to provide a turn indicator on the aerial for any desired type such as the side mounted type, or that type which is mounted centrally and above the forward portion of the automobile windshield.

A further object of my invention is to provide a turn indicator which is completely visible when indicating either direction.

A further object of my invention is to provide the aforementioned objects in a simple construction which can be manufactured at a reasonable cost.

Figure 1:
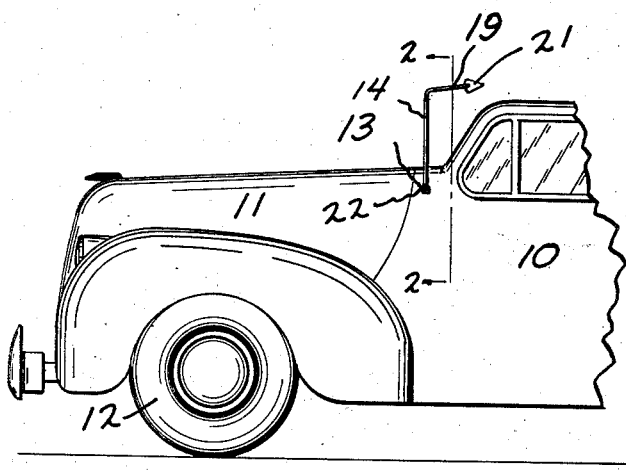
Figure 2:
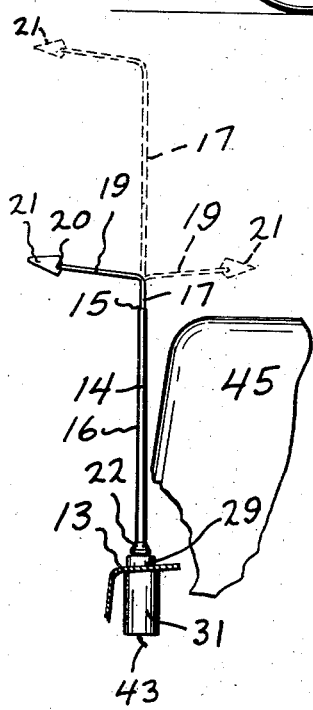
Figure 3:
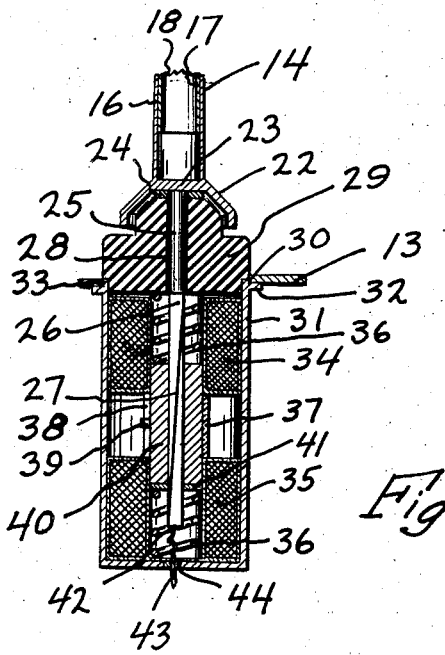

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a side elevation of the turn indicator as attached to an automobile and the aerial, Figure 2 is a fragmentary sectional view taken along the lines 2—2 of Figure 1 and showing the arrow in the left turn position, Figure 3 is a detail of the electrical arrangement for operating the indicator, Figure 4 is a detail of the mechanical arrangement for swinging the indicator, with a portion thereof being taken along the lines 4—4 of Figure 5, Figure 5 is a detail, Figure 6 is a modified form of the device, Figure 7 is a view of the control knob for the mechanical arrangement, Figure 8 is a modified form of the arrangement as employed in that type of aerial used on the upper windshield frame, and Figure 9 is a further modified form.

My invention contemplates principally the provision of an indicating arrangement, which can be incorporated directly with a radio aerial of the vertical type. Since this type of aerial is usually always positioned on the left-hand side of the automobile or at the center, it correspondingly lends itself readily to a device of this character which is in the proper location.

I have used the character 10 to designate generally an automobile having the hood 11, forward wheels 12, and the substantially horizontal frame portion 13. The aerial is usually mounted on the portion 13, although the same can be mounted at the side of the automobile, although I shall explain the structure as mounted in the substantially flat portion, it being understood that the same arrangement can be employed at the side.

The character 14 designates an outer slightly tapered tube terminating at 15 and which includes the raised bead 16, and telescopically engaged within the tube 14 is a further hollow tube 17 which includes the raised bead 18 adapted to be received in the bead 16, thereby maintaining the tube 17 in locked relation to the tube 14 to prevent rotatable turning with respect thereto. The inner tube 17 which if desired can be made of solid rod is bent into the outwardly extending portion 19 which is attached at 20 to the thin arrow shaped member 21 which can be of any highly polished material, and which also can be painted with a phosphorescent paint which will glow in the dark, as also can be the portion 19.

The tube 14 extends into the angularly extending apron 22 adapted to act as a watershed and also terminates in the portion 23 which is adapted to rotate upon a suitable bearing washer 24 which includes an opening for receiving the shaft 25 which shaft 25 extends into the lower square portion 26 which is twisted or pitched, the line of such pitch being indicated by the character 27. The shaft 25 passes through the opening 28 in the insulating bushing 29 which bushing 29 is attached at 30 to the cylindrical casing 31, the casing 31 being supported by means of the lips 32 within a suitable opening 33 which opening is drilled into the portion 13 of the automobile.

Attached interiorly of the casing 31 is an upper electric solenoid 34, and a lower solenoid 35, which solenoids receive the compression springs 36. Attached between the solenoids is a fibre or other tube 37 which includes the vertical slot 38 which slot 38 receives a pin 39 which pin is attached to the cylindrical iron core 40. The core 40 includes an opening which registers smoothly with the pitched portion 26 and 27 of the shaft 25. The lower spring 36 bears against an insulating washer 41, and attached at 42 to the bottom of the member 26 is the aerial lead 43 which is slightly coiled within the casing and which passes through the bushing 44 to the radio.

The respective solenoids 34 and 35, each pass to a suitable switch on the dashboard of the vehicle marked "left turn" and "right turn," and are further connected in the battery circuit.

The manner of operation is as follows: the arrow members 21 and 19 normally are positioned as in Figure 1 and pointing rearwardly. When the upper solenoid 34 is actuated by closing the left turn switch the iron plunger 40 is raised within such solenoid and through the engagement of the plunger 40 with the pitched member 27 will correspondingly rotate the shaft 25 as well as the entire aerial to the left position as shown in Figure 2, the engagement of the pin 39 in the slot 38 maintaining the correct position. For right turn, the right turn switch controlling the solenoid 35 is actuated pulling the plunger 40 downwardly whereby the engagement thereof with the portion 27 will rotate the arrow in the opposite direction as shown by the dotted structure in Figure 2 and indicating a right turn. I have further used the character 45 in Figure 2 to indicate the rear and top of the vehicle, showing how the arrow will indicate to a rear driver at any position over the top of the vehicle, and as well, at the side also.

The stationary portion 14 of the aerial can be made slightly taller to insure visibility at right turn. As it is desired to increase the capacity of the aerial, the inner tube 17, which as stated heretofore can be made smaller if such is desired, is pulled out to a raised or higher position as shown by the further dotted structure in Figure 2. The springs 36 maintain a balanced position against the core 40 when the arrow is pointing to the rear in a neutral position and correspondingly cause return of the same instantly when the respective switches are opened.

The entire casing 31 with its insulated arrangement can be readily attached to the vehicle since it is formed in a composite unit. Figures 4, 5, and 7 illustrate a possibly preferred form of the device wherein it is controlled by a mechanical or manually operated arrangement. In this arrangement the shaft 25 is attached to the arm 46 which members are mounted within a casing 47 and attached at 48 to the shaft 25 is a torsion spring 49 which is attached to the insulated bottom 50 of the casing 47 and at the bottom 45 is attached the aerial lead 43. Pivotally attached at 51 to the arm 46 is the control wire or rod 52 which passes through a hollow flexible conduit 53 which communicates at 54 with a small casing 55 which is attached at 56 to the dashboard 57 of the automobile.

A circular control knob 58 is attached to a short shaft 59 to which is attached the arm 60 at the end thereof to which arm 60 is pivotally attached at 61, the other extremity of the control rod 52. At neutral position the arm 60 is as indicated in Figure 7 and directly horizontal and toward the right, the further dotted structures of the arm showing the left or right turn position. A small pointer 62 is attached to the knob 58 and is adapted to coincide with the character at 63 or the character at 64 to show lefthand or righthand turns respectively.

The torsion spring 49 is normally adapted to exert its tension against the shaft 25 to turn the arrow towards the left. The knob 58 includes the small raised teat 65 engaged in suitable depressions in the dashboard 57 to maintain the knob in any desired position. It will be noted that when the pointer 62 is turned toward the left or the character marked "L" or for providing a right turn, the arm 60 will raise to the upper vertical position allowing the torsion spring 49 to carry the shaft 25 so that the arrow is at the lefthand position.

Conversely when the arm 60 is swung to the right by moving the pointer 62 to the "R" position the rod 52 will be pulled carrying the arm 46 as well as the arrow to the right position. This then provides a simple mechanical arrangement for effecting the turning of the indicating device. Figure 6 indicates a possibly preferred form of the arrangement, wherein it is desired to have the arrow members mounted on a fixed portion of the aerial, in those cases where it is desired to open the aerial to its maximum height, and where it is desired to maintain the arrow in a slightly more rigid condition during all positions of the aerial.

In this form of structure the same arrangement is employed with the exception that the arrow portion 19 is attached to the lower tube 14, and the upper collapsing members 66 can be operated independently thereof with the arrow thereby remaining in one position vertically.

This form may be the preferred form under certain conditions, although either form can be used. Figure 8 illustrates a modification wherein the same type of casing as illustrated heretofore is used with either the electrical or mechanical arrangement, and wherein the casing is attached to the upper forward portion of the windshield 67 of the vehicle with the controlling cable or wires passing downwardly along the central strip 68 which divides the windshield. This type of device conforms to that type of aerial which is used in this particular location and includes the substantially vertical portion 69 which terminates in the portion 70 and the arrow portion 71.

Turning of this type of arrow will also indicate left or right turns and is, completely visible above the vehicle and also requires no collapsing parts. Figure 9 illustrates a modification where-in an inner male portion 72 can be bent into the configuration at 73, 74, and 75 all made in a continuous manner from the portion 72 and thereby increasing the aerial length, with a thin sheet metal portion at 76 being highly polished, etc., and with a series of reflector buttons 77 attached between the members 73 and 75 to enhance the effect of the arrow at night.

It will now be seen that I have provided all of the advantages mentioned in the objects of my invention with other advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In combination with a radio aerial of the vertical type for automobiles having a lower female tube and collapsible sections telescopically engaged therein, an arrow member attached substantially at right angles to said lower tube, means for rotating said tube to desired selective position for indicating left or right turns of the automobile.

2. In combination with a radio aerial of the vertical type for automobiles, an arrow member attached at right angles to the vertical aerial, means for rotating said arrow member to desired position to indicate left or right turns of the automobile.

AUGUST F. PFINGSTEN.